United States Patent
Wong et al.

(10) Patent No.: US 12,210,697 B1
(45) Date of Patent: Jan. 28, 2025

(54) SYSTEM AND METHOD FOR MAINTAINING CURSOR SPEED ACROSS A PLURALITY OF VIDEO DISPLAY DEVICES WITH DIFFERENT DISPLAY RESOLUTIONS

(71) Applicant: Dell Products, LP, Round Rock, TX (US)

(72) Inventors: Kai Leong Wong, Singapore (SG); Gim Guan Tan, Singapore (SG); Manish Krishnaji Desai, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/376,746

(22) Filed: Oct. 4, 2023

(51) Int. Cl.
*G06F 3/038* (2013.01)
*G06F 3/04812* (2022.01)

(52) U.S. Cl.
CPC ........ *G06F 3/0383* (2013.01); *G06F 3/04812* (2013.01)

(58) Field of Classification Search
CPC .......................... G06F 3/0383; G06F 3/04812
See application file for complete search history.

(56) References Cited

U.S. PATENT DOCUMENTS

| | | | |
|---|---|---|---|
| 9,262,182 B2 | 2/2016 | Mullens | |
| 9,423,994 B2 | 8/2016 | Suresh | |
| 9,952,957 B2 | 4/2018 | Mullens | |
| 11,893,174 B1 * | 2/2024 | Wong | G06F 3/038 |
| 2008/0062131 A1 | 3/2008 | Chan | |
| 2012/0274558 A1 | 11/2012 | Broms | |
| 2021/0286445 A1 * | 9/2021 | Seibert | G06F 3/03543 |
| 2022/0148134 A1 | 5/2022 | Cantu | |
| 2022/0404915 A1 * | 12/2022 | Chapman | G06F 3/0304 |

FOREIGN PATENT DOCUMENTS

WO 2013/0126338 A1 8/2013

* cited by examiner

*Primary Examiner* — David D Davis
(74) *Attorney, Agent, or Firm* — Prol Intellectual Property Law, PLLC; H. Kenneth Prol

(57) ABSTRACT

A mouse operatively coupled to an information handling system includes a mouse microcontroller, a mouse memory device to receive data describing display device pixel per inch (ppi) density values associated with a first and second video display device operatively coupled to the information handling system. The mouse microcontroller execute code instructions of a cursor tracking agent to track a location of a cursor, controlled by the movement of the mouse, across the first video display device and second video display device. Further, the mouse microcontroller execute code instructions of a monitor calibration agent to maintain cursor speed across the first video display device and the second video display device by adjusting mouse ppi values for the mouse cursor speed and switching between a first mouse ppi value to a second mouse ppi value when the cursor has crossed a display device boundary.

20 Claims, 5 Drawing Sheets

SYSTEM AND METHOD FOR MAINTAINING CURSOR SPEED ACROSS A PLURALITY OF VIDEO DISPLAY DEVICES WITH DIFFERENT DISPLAY RESOLUTIONS

SUMMARY OF THE DISCLOSURE

The present disclosure generally relates to a maintaining a cursor speed across a plurality of video displays. The present disclosure more specifically relates to maintaining a cursor speed across a plurality of video displays at a wired or wireless mouse in real-time.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may be wired or wirelessly coupled to a mouse that allows a user to move a cursor displayed on a plurality of video display devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
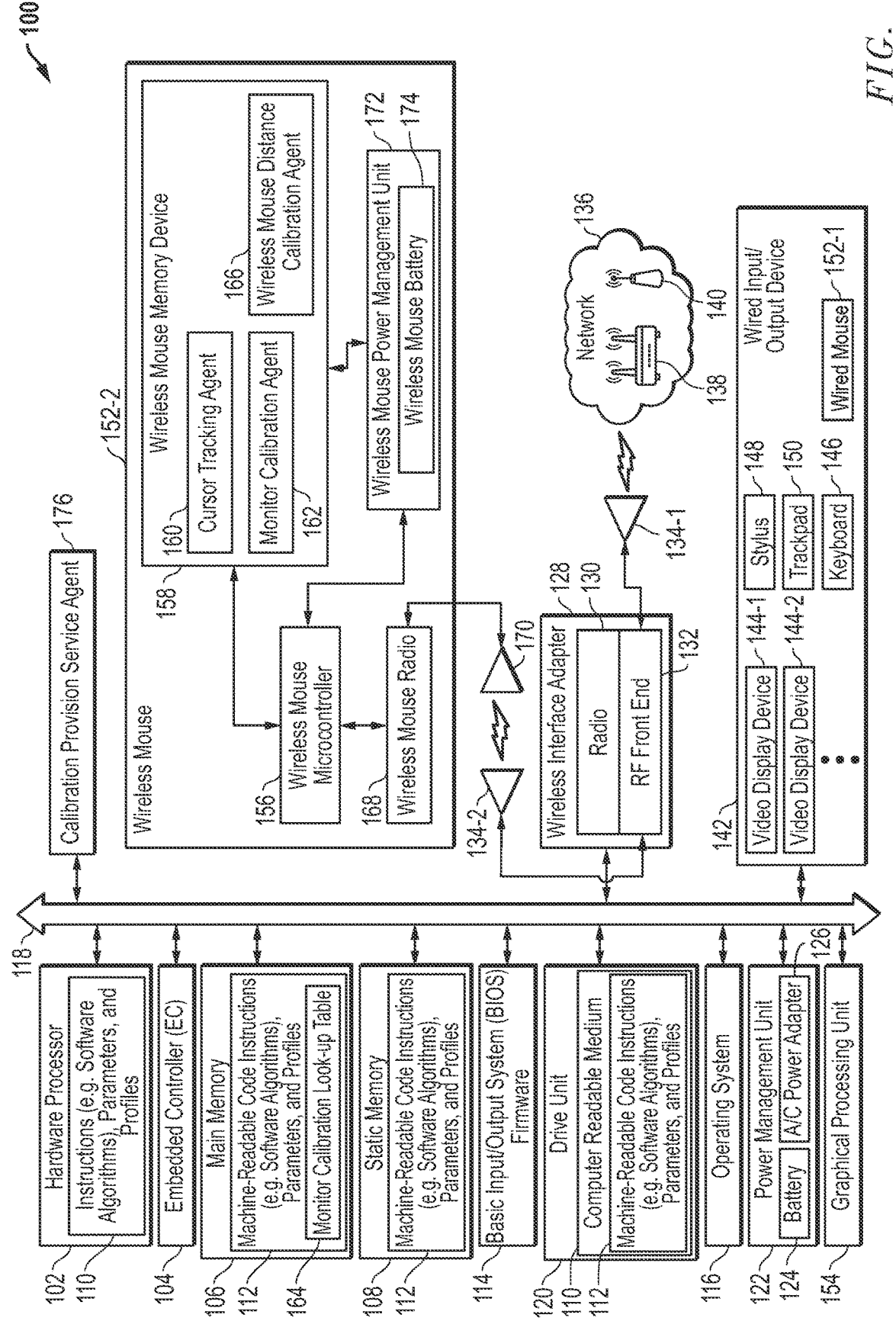
FIG. 1 is a block diagram illustrating an information handling system with a mouse capable of maintaining a cursor speed across a plurality of video display devices according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems include any number of peripheral devices such as video display devices and wired or wireless mouses to receive output from and provide input to an information handling systems. It is appreciated that some users of an information handling system may want to expand the workspace of a desktop and may accomplish this by operatively coupling one or more additional video display devices (also called monitors) to the information handling system. By selecting an option at a graphical user interface (GUI) presented at the information handling system, the user may expand the workable space thereby presenting a plurality of GUIs on a plurality of screens at one time such as a word processing document being presented on a main screen, a presentation program be presented on an external monitor to the right of this main screen, and an internet browser program being presented on another external monitor to the left of the main screen. This vastly improves a user's experience and ability to complete tasks, thereby increasing efficiency.

However, it is also appreciated that the sizes of these plurality of video display devices may vary amongst each other. Additionally, these other video display devices may have a pixel per inch (ppi) value that differs amongst each other such that as the user interacts with these video display devices, these differences are detectable. For example, where the user is interfacing with the information handling system and these additional video display devices, the user may use the mouse to cause a cursor to be moved across a plurality of these video display devices. At the main video display device (e.g., a screen on a laptop-type information handling system) the cursor may be moved across this main video display device at a certain speed based on a mouse pixel per inch (ppi) value associated with the mouse and the video display device ppi density value associated with the main video display device. The mouse movement may be defined by a mouse ppi or dots per inch (dpi) speed of movement associated with movement of the mouse as a pointer. The display may have a pixel density of video display device pixels per inch (ppi) density value. The dpi of a mouse movement (e.g., over 1 cm) may move a cursor further and farther over a lower pixel density monitor than a high pixel density monitor. This "cursor speed" for mouse movement may have been manually selected by the user via a mouse firmware GUI that allowed the user to select the cursor speed based on the user's personal comfort. However, because of the different video display device ppi pixel density values associated with the other video display devices, as the user moves the mouse from the first main video display device to, for example, the second video display device placed to the right of the main video display device, the speed of the cursor may noticeably increase or decrease based on the new video display device ppi pixel density value associated with the second video display device. This noticeable cursor speed change can affect the user's ability to properly operate the mouse to properly interact with those GUIs presented among and on the plurality of video display devices of the information handling system.

The present specification describes a system and method to dynamically adjust a wired or wireless mouse ppi value associated with the wired or wireless mouse as the cursor crosses a boundary between the first video display devices and the second video display device. This dynamic adjustment of the wired or wireless mouse ppi value associated with the wired or wireless mouse may prevent a detectable change in cursor speed by the user thereby increasing the productivity and usability of the information handling system with the plurality of video display devices from loss of the cursor or unexpected cursor movement.

In an embodiment, a wired or wireless mouse communicating with an information handling system may include a wired or wireless mouse microcontroller, a wired or wireless mouse memory device, and a wired or wireless mouse power management unit (PMU) to provide power to the wired or wireless mouse microcontroller and wired or wireless mouse memory device. The wired or wireless mouse may also include a wired or wireless mouse microcontroller to receive data describing pixel per inch (ppi) values associated with each of a plurality of video display devices operatively coupled to the information handling system. The wired or wireless mouse also includes a cursor tracking agent to, when executed by the wired or wireless mouse microcontroller, track a location of a cursor, controlled by the movement of the wired or wireless mouse by a user, across a plurality of video display devices. A monitor calibration agent is also included to, when executed by the wired or wireless mouse microcontroller, maintain cursor speed across the plurality of video display devices by calculating different wired or wireless mouse pixel per inch (ppi) values to be associated with the wired or wireless mouse based on detected video display device ppi density values of the plurality of video display devices and switching between a first mouse ppi value of the wired or wireless mouse to a second mouse ppi value of the wireless mouse when the cursor tracking agent has detected that the cursor has crossed a boundary from a first video display device to a second video display device among the plurality of video display devices.

In an embodiment, a wired or wireless mouse distance calibration agent may also be included at the wired or wireless mouse to, when executed by a wired or wireless mouse microcontroller, detect a distance between the wired or wireless mouse and maintain a ratio of cursor distance across the plurality of video display devices to wired or wireless mouse distance from the display device to maintain a sensation of the cursor maintaining its size and cursor speed. In an embodiment, a monitor calibration look-up table may be used to, when accessed by the wired or wireless mouse microcontroller, provide data describing how to adjust the cursor speed of the wired or wireless mouse across the plurality of video display devices based on the detected different video display device ppi density values of the plurality of video display devices to a user for acceptance by a user.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or a plurality of sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, hardware processor 102, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as a keyboard 146, a trackpad 150, a wireless mouse 152-2, wired mouse 152-1, a stylus 148, a video/graphics display devices 144-1, 144-2, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 180, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wireless communication with the I/O devices 142 such as a keyboard 146, a wireless mouse 152-2, a wired mouse 152-1, video display devices 144-1, 144-2, stylus 148, or trackpad 150 among other peripheral devices.

The information handling system 100 further includes one or more video/graphics display devices 144-1, 144-2. The video/graphics display devices 144-1, 144-2 in an embodiment may function as a liquid crystal display (LCD), an organic light emitting diode (OLED), a flat panel display, or a solid-state display. Additionally, as described herein, the information handling system 100 may include one or more other I/O devices 142 including a wired mouse 152-1 or wireless mouse 152-2 that allow the user to interface with the information handling system 100 via the video/graphics display devices 144-1, 144-2, such as a cursor control device (e.g., the wireless mouse 152-2, wired mouse 152-1, trackpad 150, or gesture or touch screen input), a stylus 148, and/or keyboard 146, among others. Various drivers and control electronics may be operatively coupled to operate the I/O devices 142 according to the embodiments described herein. It is appreciated that the video display devices 144-1, 144-2 may be arranged side-by-side so that a desktop area may be increased as a result of the individual screens on the video display devices 144-1, 144-2 being used to display a plurality of windows. This is often referred to as an extended desktop where a plurality of video display devices 144-1, 144-2 such as in the embodiments described herein.

A network interface device of the information handling system 100 shown as wireless interface adapter 128 can provide connectivity among devices such as with Bluetooth® (BT) (e.g., 2.4 GHz) or to a network 136, e.g., a wide area network (WAN), a local area network (LAN), wireless local area network (WLAN), a wireless personal area network (WPAN), a wireless wide area network (WWAN), or other network. In an embodiment, the wireless mouse 152-2 may communicate and transceive data to and from the information handling system 100 using a BT® communication protocol at, for example, a 2.4 GHz ISM spectrum band. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134-1, 134-2 and other circuitry of the radio 130 such as one or more antenna ports used for wireless communications via a plurality of radio access technologies (RATs). In an embodiment, the wireless interface adapter 128 may be associated with a plurality of antennas 134-1, 134-2 used to communication with a network device (e.g., via a first antenna 134-1) or to a wireless peripheral device such as the wireless mouse 152-2 (e.g., via a second antenna 134-2) using different wireless communication standard. The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, BT® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device or wireless interface adapter 128.

The information handling system 100 may include a set of instructions 112 that may be executed to cause the computer system to perform any one or more of the methods or computer-based functions disclosed herein. For example, instructions 112 may be executed by a hardware processor 102, GPU 154, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or a plurality of media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 154, a video/graphic display device 144-1, 144-2, or other wired I/O devices 142 such as the stylus 148, a wired or wireless mouse 152-1, 152-2, a keyboard 146, and a trackpad 150 and other components that may require power when a power button has been actuated by a user. In an embodiment, the PMU 122 may monitor power levels and be electrically coupled, either wired or wirelessly, to the information handling system 100 to provide this power and coupled to bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system includes a wired or wireless mouse 152-1, 152-2 operatively coupled to the information handling system 100 either wirelessly or via a wired connection. As described herein, the wireless mouse 152-2 includes a wireless mouse radio 168 including a wireless mouse antenna 170 used to wirelessly communication with the information handling system in order to transceive data as described herein. For example, the wireless mouse radio 168 may communicate with the information handling system 100 and wireless interface adapter 128 with antenna 134-2 via a BT®/Bluetooth Low Energy (BLE)® wireless protocol or other wireless protocol using the wireless mouse antenna 170 in an embodiment. In an embodiment, the wired mouse 152-1 includes a wire that operatively couples the wired mouse 152-1 to the information handling system via, for example, a universal serial bus (USB) port. The wired or wireless mouse data includes cursor position data from movements of the wired or wireless mouse 152-1, 152-2 that is interpreted by the hardware processor 102 of the information handling system 100 as input data used to move a cursor across the video display devices 144-1, 144-2 described herein. This data may also include input data from the wired or wireless mouse 152-1, 152-2 indicative of the actuation of one or more buttons or scroll wheel inputs on the wired or wireless mouse 152-1, 152-2 that is used to move or select objects presented on a graphical user interface (GUI) presented on the video display devices 144-1, 144-2. As described herein, the cursor movement across the plurality of video display devices 144-1, 144-2 may be different in current computing environments. For example, the information handling system 100 may be a laptop-type or desktop-type information handling system 100 that includes a plurality of video display devices 144-1, 144-2 (at least two video display devices 144-1, 144-2). These video display devices 144-1, 144-2 are physically arranged on the user's desk and are further digitally arranged at the information handling system 100 so that the usable space is extended from a first video display device 144-1, 144-2 to a second video display device 144-1, 144-2. This is usually called extending the desktop and, in some embodiments, may include the extension of the desktop across more than two video display devices 144-1, 144-2. Software associated with video display device 144-1, 144-2 detection, arrangement, and extension of the desktop may be run by the basic input/output system (BIOS) 114 and/or operating system (OS) 116 of the information handling system 100. In an embodiment, a first and second video display device 144-1, 144-2 may be operatively coupled to the information handling system 100 by a wired or wireless connection. It is appreciated that these plurality of video display devices 144-1, 144-2 may have different sizes and resolutions. For example, a first video display device 144-1, 144-2 of a laptop-type information handling system 100 may have a size of 13.3 inches in the diagonal and a resolution of 2560×1600 having 2560 pixels along the horizontal edge and 1600 pixels along the vertical edge. A second video display device 144-1, 144-2 (e.g., an external monitor either wired or wireless), in an example embodiment, may have a size of 40 inches in the diagonal and a resolution of 5120×2160 having 5120 pixels along the horizontal edge and 2160 pixels along the vertical edge.

It is appreciated, however, that the wired or wireless mouse 152-1, 152-2 also has an active mouse ppi or dpi movement setting in which movement of the wired or wireless mouse 152-1, 152-2 one inch causes the cursor on any given screen to move a certain number of pixels or dots. This is called the mouse ppi or dpi. This mouse ppi may be adjusted, digitally, by a user by manually interfacing with computer readable program code of a mouse customization software that allows a user to access a mouse customization GUI and adjust this mouse ppi. A larger mouse ppi may result in a more "sensitive" cursor wherein the cursor moves across more pixels for each inch of wired or wireless mouse movement than would the user setting the mouse ppi to a smaller mouse ppi setting. Whatever the mouse ppi setting is, however, this is usually not changed during use as the user moves the wired or wireless mouse 152-1, 152-2 across the screens of the plurality of video display devices 144-1, 144-2. However, due to the differences in a first video display device 144-1 ppi and second video display device 144-2 ppi (e.g., the different resolutions and sizes) among the plurality of video display devices 144-1, 144-2, the detected cursor speed or number of pixels of movement across the first of the video display devices 144-1 and the second of the video display devices 144-2 is different. This may be especially noticeable by the user when the digital boundary between the first of the video display devices 144-1 and the second of the video display devices 144-2 is crossed by the cursor upon movement of that cursor via movement of the wired or wireless mouse 152-1, 152-2. Indeed, this cursor speed deviation is magnified when the monitor density deviation or differences between the first video display device 144-1 ppi density and the second video display device 144-2 ppi density is large between the two video display devices 144-1, 144-2. This resulting difference in speed may cause the user accidentally select, drag, or otherwise interact with objects on the GUIs presented on these different video display devices 144-1, 144-2 or result in an unpleasant interaction such as a lost cursor for a short period of time.

The wired or wireless mouse 152-1, 152-2 in the embodiments herein, therefore, include a cursor tracking agent 160 and a monitor calibration agent 162 that, when executed by the wired or wireless mouse microcontroller 156, maintain cursor speed across the screens of the video display devices 144-1, 144-2 despite their differences in resolutions. In an embodiment, the execution of the cursor tracking agent 160 allows the wired or wireless mouse 152-1, 152-2 to actively track a current cursor position across the video display devices 144-1, 144-2 such that when an event occurs indicating a transition from the first video display device 144-1, 144-2 to the second video display device 144-1, 144-2, the execution of the monitor calibration agent 162 will apply a new mouse ppi setting at the wired or wireless mouse 152-1, 152-2, automatically, that will maintain a cursor speed based on the second video display device 144-2 ppi density detected at the second video display device 144-1, 144-2 (e.g., based on the size and resolution of the second video display device 144-1 from which the second video display device 144-2 ppi density is determined).

During operation, the mouse microcontroller 156 may communicate with a calibration provision service agent 176 executed by a hardware processor 102 of the information handling system 100. Part of the data received from the information handling system 100 via the calibration provision service agent 176 at the wired or wireless mouse 152-1, 152-2 includes data such as the selected mouse ppi of the wired or wireless mouse 152-1, 152-2 (e.g., MS_ppi), the first video display device 144-1 ppi density associated with the first video display device 144-1 (e.g., Mon1_ppi), the second video display device 144-2 ppi density associated with the second video display device 144-2 (e.g., Mon2_ppi), as well as the video display device ppi associated with any additional video display device operatively coupled to the information handling system 100. This data is used by the mouse microcontroller 156 to specifically control and maintain the speed of the cursor as described herein.

Once this data has been received, the mouse microcontroller 156 may derive a dynamic mouse ppi of the wired or wireless mouse 152-1, 152-2 (e.g., MS_ppi2) that is to be used once it has been detected that the cursor has crossed from the first video display device 144-1 to the second video display device 144-2. This may be done, in an embodiment, by accessing a monitor calibration look-up table 164 stored on a mouse memory device 158 to select correct dynamic mouse ppi settings without using an external method of deriving the mouse ppi of the wired or wireless mouse 152-1, 152 (e.g., MS_ppi2). In an embodiment, the mouse microcontroller 156 may be used to calculate the dynamic mouse ppi of the wired or wireless mouse 152-1, 152-2 (e.g., MS_ppi2). In one embodiment, the mouse microcontroller 156 may divide the set mouse ppi of the wired or wireless mouse 152-1, 152-2 at the first video display device 144-1 by the first video display device ppi density of the first video display device 144-1. This quotient is then multiplied by the second video display device ppi density of the second video display device 144-2 to get the mouse ppi of the wired or wireless mouse 152-1, 152-2 to be used at the second video display device 144-2 to maintain a cursor speed ratio. This process may be repeated for each additional video display device until the dynamic adjustment to the dynamic mouse ppi of the wired or wireless mouse 152-1, 152-2 describing the cursor speed at each of the video display devices 144-1, 144-2, etc. has been derived (e.g., where more than two video display devices are detected at the information handling system 100).

Having derived or otherwise obtained the dynamic adjustments to the dynamic mouse ppi of the wired or wireless mouse 152-1, 152-2 at each of the video display devices 144-1, 144-2, etc., the mouse microcontroller 156 may concurrently execute a cursor tracking agent 160 to monitor when to trigger the different dynamic mouse ppi settings under which the wired or wireless mouse 152-1, 152-2 is to operate under across each of the different video display devices 144-1, 144-2, etc. In one embodiment, data on the dynamic adjustments to the dynamic mouse ppi settings may be determined at the information handling system 100 and may be relayed from the information handling system 100 to the wired or wireless mouse 152-1, 152-2. In an embodiment when the wired or wireless mouse 152-1, 152-2 is initialized, a self-homing position algorithm may move the cursor to an edge (e.g., a left edge) of the primary video display device 144-1, for example, to set a known origin of a horizontal position on the video display device 144-1. In an example embodiment, this self-homing position algorithm may move the cursor to a 0 horizontal position and any vertical position so long as the vertical position is relayed to the wired or wireless mouse 152-1, 152-2. As the wired or wireless mouse 152-1, 152-2 is physically moved by a user, the wired or wireless mouse 152-1, 152-2 reports a relative position of "x" horizontal position on any video display device 144-1, 144-2, etc. and a "y" vertical position on any video display device 144-1, 144-2, etc. to the information handling system 100 and those hardware processors (e.g., 102) that handle the data to be received from the wired or wireless mouse 152-1, 152-2. This relative mouse position data relayed to the information handling system 100 from the wired or wireless mouse 152-1, 152-2 may be in the form of a vector such as Ax+By where "A" is the number of pixels in the horizontal "x" direction and "B" is the number of pixels in the vertical "y" direction. It is appreciated that the values of both "A" and "B" can be positive or negative numbers such that a negative value of "A" is indicative of the cursor moving to the left, a positive value of "A" is indicative of the cursor moving to the right, a negative value of "B" is indicative of the cursor moving upward, and a positive value of B is indicative of the cursor moving downward.

As a result, the summation of all vectors reflect the current cursor position on any of the plurality of video display devices 144-1, 144-2, etc. During use of the wired or wireless mouse 152-1, 152-2, the cursor tracking agent 160 executed by the mouse microcontroller 156 with the first dynamic mouse ppi value to be associated with the operation of the wired or wireless mouse 152-1, 152-2 at the first video display device 144-1 (e.g., MS_ppi1) is applied when the cursor is detected as being present on the first video display device 144-1 among the plurality of video display devices 144-1, 144-2, etc. Similarly, a second dynamic mouse ppi value is associated with the operation of the wired or wireless mouse 152-1, 152-2 at the second video display device 144-2 (e.g., MS_ppi2) when the cursor is detected as being present on the second video display device 144-2 among the plurality of video display devices 144-1, 144-2, etc. This can also be propagated over any number of video display devices 144-1, 144-2, etc. detected such that an nth dynamic mouse ppi value is associated with the operation of the wired or wireless mouse 152-1, 152-2 at the nth detected video display device (e.g., MS_ppin) when the cursor is detected as being present on the nth video display device among the plurality of video display devices 144-1, 144-2, etc.

As described herein, the physical movement of the wired or wireless mouse 152-1, 152-2 by, for example, an inch, the number of pixels the cursor has moved is calculated, for each move, by dividing the ppi associated with the wired or wireless mouse 152-1, 152-2 (e.g., MS_ppi) by the current monitor's ppi (e.g., Mn_ppi; Mn is the nth monitor) to obtain the current dynamic mouse ppi setting for a current monitor where the cursor is present. In order to maintain the cursor speed across the different video display devices 144-1, 144-2, the speed ratio (e.g., SP) has to be the same or maintained (SP=MSppi/Mn_ppi) to be within an acceptable range that prevents the user from detecting a speed difference between the different video display devices 144-1, 144-2, etc. Again, it is appreciated that the user has set the ppi of the wired or wireless mouse 152-1, 152-2 (e.g., MS_ppi) and, therefore, the adjustments to the mouse ppi of the wired or wireless mouse 152-1, 152-2 are based on the individual video display device ppi density values associated with each of the individual video display devices 144-1, 144-2, etc. that have been received by the mouse microcontroller 156 from the information handling system 100. By continuously tracking the position of the cursor across the plurality of video display devices 144-1, 144-2, etc. via execution of the cursor tracking agent 160, a constant cursor speed is maintained when the cursor crosses a border between any of the plurality of video display devices 144-1, 144-2, etc.

It can be appreciated that the systems and methods described herein may include the implementation of a mouse firmware executed on the information handling system 100.

This firmware may provide a user with a GUI that allows the user to change the set mouse ppi value associated with the wired or wireless mouse 152-1, 152-2 to match a cursor speed, at least, on a main video display device 144-1 per the user's customizations. In an embodiment, the firmware may allow access to a monitor calibration look-up table 164 either maintained on a memory device at the information handling system 100 or over a network and maintained on a network server and accessible via execution of a web human interface device (HID) services such as Dell® SupportAssist®. This allows the user to, at least, select a desired mouse ppi value associated with the wired or wireless mouse 152-1, 152-2 that determines the cursor speed. This mouse ppi value may be changed if the user wants the cursor to be moved slower or faster. In an embodiment, the execution of this mouse firmware executed on the information handling system 100 may also provide a user with suggested cursor speed values for dynamic mouse ppi values based on the detected sizes and resolutions associated with each detected video display device 144-1, 144-2, etc. at the information handling system 100. The user may accept these suggested dynamic mouse ppi values to be associated with the wired or wireless mouse 152-1, 152-2 or reject them allowing the user to manually adjust the desired cursor speed value. Nevertheless, the systems and methods described herein, adjusts the ppi value associated with the wired or wireless mouse 152-1, 152-2 as the movement of the wired or wireless mouse 152-1, 152-2 by the user causes the cursor speed to remain constant across the plurality of different video display devices 144-1, 144-2, etc.

It is appreciated that those elements shown and described in connection with the wireless mouse 152-2 are also included within a housing of the wired mouse 152-1 described herein. Therefore, although the present specification describes a wireless mouse 152-2 that includes a wireless mouse memory device 158, a cursor tracking agent 160, a monitor calibration agent 162, a wireless mouse distance calibration agent 166, a wireless mouse PMU 172, and a wireless mouse battery 174, similar elements are included within a wired mouse 152-1 as well. For example, a wired mouse 152-1 may include a wire that operatively couples the wired mouse 152-1 to an information handling system 100 via, for example, a USB port while also including a cursor tracking agent, a monitor calibration agent, a mouse distance calibration agent, and a mouse PMU. Therefore, the present specification contemplates a wired and wireless version of the mouse described herein and similar principles of the systems and methods described herein equally apply in both the wired and wireless versions of the mouse.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
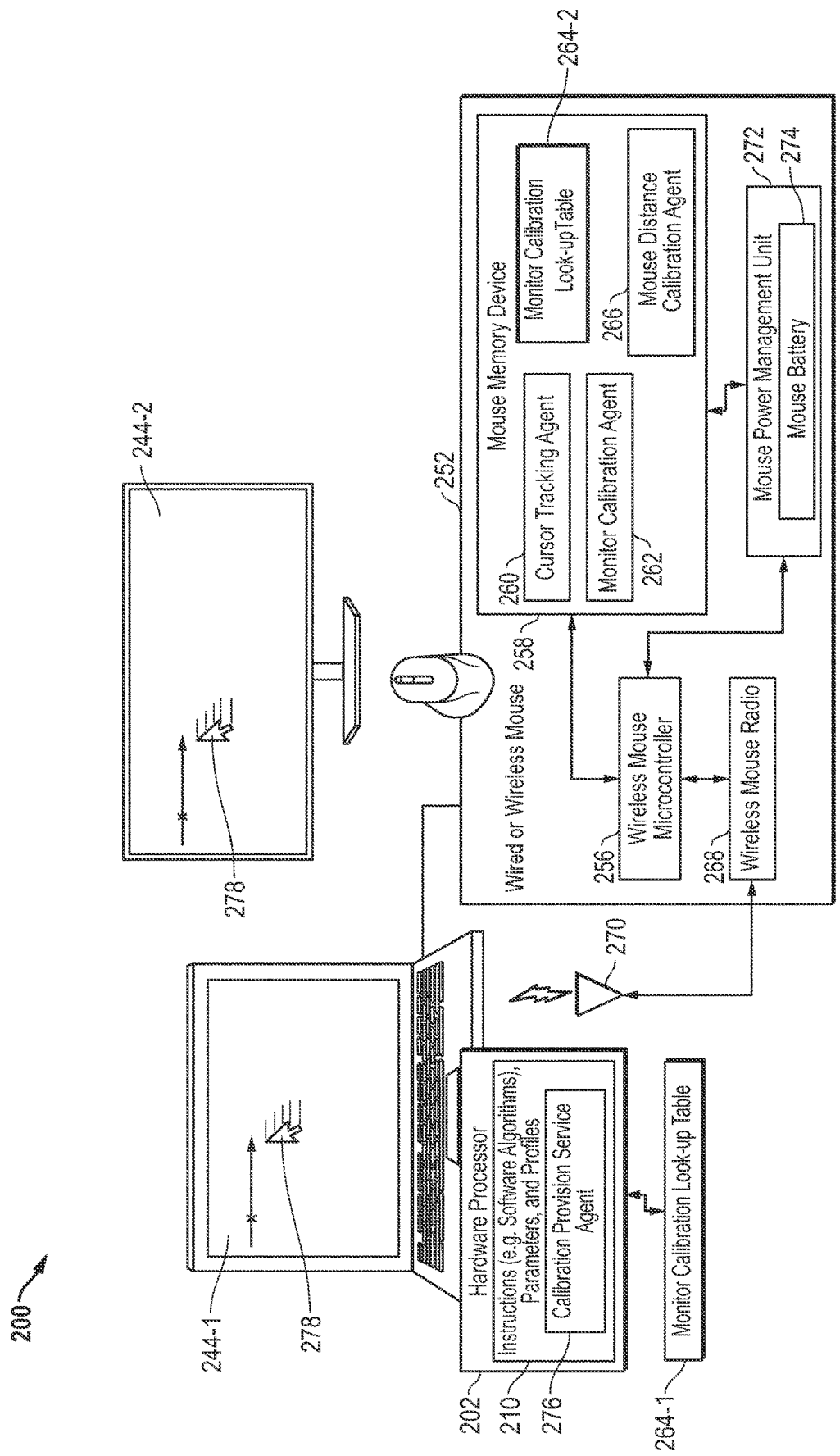
FIG. 2 is a block diagram of an information handling system with a mouse capable of maintaining a cursor speed across a plurality of video display devices according to another embodiment of the present disclosure.

FIG. 2 is a block diagram of an information handling system 200 with a wired or wireless mouse 252-1, 252-2 capable of maintaining a cursor speed across a plurality of video display devices 244-1, 244-2 according to another embodiment of the present disclosure. As described herein, the information handling system 200 may be a laptop-type information handling system 200 that includes a first video display device 244-1 that is operatively coupled to the information handling system 200 via, for example, a hinge thereby allowing the first video display device 244-1 in its display chassis to be moved relative to a base portion of the laptop-type information handling system 200 via this hinge. Additionally, the information handling system 200 may include a second video display device 244-2 operatively coupled to the information handling system 200. The second video display device 244-2 may be operatively coupled to the information handling system 200 via a wired or wireless connection. In an embodiment, as described herein, the usable desktop area has been expanded via a display settings GUI accessible to the user and presented via execution of a hardware settings program by the hardware processor 202. This allows a user to move the wired or wireless mouse 252-1, 252-2 a distance so as to move the cursor 278 across all of the screens of the first video display device 244-1 and the second video display device 244-2. As described herein, the boundaries of the first video display device 244-1 may be crossed by the cursor 278 so that the cursor 278 appears at a matching boundary at the second video display device 244-2. In the example shown in FIG. 2, as the cursor 278 moves right and crosses a right edge of the first video display device 244-1, the cursor appears at a left edge of the second video display device 244-2. It is also appreciated that additional video display devices may be operatively coupled to the information handling system 200 and physically placed to the right of the second video display device 244-2 or left of the first video display device 244-1 or even above any of the display devices. The display settings GUI may also allow a user to digitally indicate the physical location of the individual video display devices 244-1, 244-2 relative to each other such that the cursor 278 may cross any edge of the first video display device 244-1 and appear physically at the correct edge of any other video display device including the second video display device 244-2.

As described herein, the information handling system includes a wired or wireless mouse 252-1, 252-2 operatively coupled to the information handling system 200. As described herein, the wired or wireless mouse 252-1, 252-2 includes a wireless mouse radio 268 including a wireless mouse antenna 270 used to wirelessly communication with the information handling system in order to transceive data as described herein. This data includes position data of the wired or wireless mouse 252-1, 252-2 that is interpreted by the hardware processor 202 of the information handling system 200 as input data used to move a cursor across the first video display device 244-1 and second video display device 244-2 described herein. This data may also include input data from the wired or wireless mouse 252-1, 252-2 indicative of the actuation of one or more buttons or scroll wheel or other input devices on the wired or wireless mouse 252-1, 252-2 that is used to move or select objects presented on a graphical user interface (GUI) presented on the video display devices 244-1, 244-2. As described herein, the cursor movement across the plurality of video display devices 244-1, 244-2 may be different in current computing environments. For example, the information handling system 200 may be a laptop-type or desktop-type information handling system 200 that includes a plurality of video display devices 244-1, 244-2 (at least two video display devices 244-1, 244-2 as shown in FIG. 2). It is appreciated that these plurality of video display devices 244-1, 244-2 may have different sizes and resolutions. For example, a first video display device 244-1 of a laptop-type information handling system 200 may have a size of 13.3 inches in the diagonal and a resolution of 2560×1600 having 2560 pixels along the horizontal edge and 1600 pixels along the vertical edge from which a first video display device ppi density may be derived. The second video display device 244-2, in an example embodiment, may have a size of 40 inches in the diagonal and a resolution of 5120×2160 having 5120 pixels along the horizontal edge and 2160 pixels along the vertical edge from which a second video display device ppi density may be derived. In some embodiments, the horizontal dimensions of the plural video display devices and number of pixels are used to determine the video display device ppi density across the horizontal dimension when plural video display devices are arranged next to one another. In other embodiments, the vertical dimensions of the plural video display devices and number of pixels are used to determine the video display device ppi density across the vertical dimension when plural video display devices are arranged stacked above or below one another.

It is appreciated, however, that the wired or wireless mouse 252-1, 252-2 also has an active mouse ppi or dpi in which movement of the mouse one inch causes the cursor on any given screen to move a certain number of pixels. This is called the mouse ppi. This mouse ppi may be adjusted, digitally, by a user by manually interfacing with computer readable program code of a mouse customization software that allows a user to access a mouse customization GUI and adjust this mouse ppi. A larger mouse ppi may result in a more "sensitive" cursor wherein the cursor moves across more pixels when a mouse is moved than would the user setting the mouse ppi to a smaller mouse ppi setting. Whatever the mouse ppi setting is, however, this is usually not changed during use as the user moves the wired or wireless mouse 252-1, 252-2 across the screens of the video display devices 244-1, 244-2. However, due to the differences in the video display device ppi densities (e.g., the different resolutions and sizes) among the plurality of video display devices 244-1, 244-2, the detected cursor speed or number of pixels of movement across the first of the video display devices 244-1 and the second of the video display devices 244-2 is different for the wired or wireless mouse 252-1, 252-2 having one set mouse ppi or dpi level. This may be especially noticeable by the user when the digital boundary between the first video display device 244-1 and the second video display device 244-2 is crossed by the cursor 278. Indeed, this cursor speed deviation is further magnified when the monitor density deviation or differences between the first video display device ppi density and the second video display device ppi density is large between the two video display devices 244-1, 244-2. This resulting difference in speed may cause the user accidentally select, drag, or otherwise interact with objects on the GUIs presented on these different video display devices that the user didn't intend to interact with or cause the user to lose the location of the curser 278 upon transition between the first video display device 244-1 and the second video display device 244-2 or visa versa.

The wired or wireless mouse 252-1, 252-2 in the embodiments herein, therefore, include a cursor tracking agent 260 and a monitor calibration agent 262 that, when executed by the wireless mouse microcontroller 256, maintain cursor speed across the screens of the video display devices 244-1, 244-2 despite their differences in resolutions. In an embodiment, the execution of the cursor tracking agent 260 allows the wired or wireless mouse 252-1, 252-2 to actively track a current cursor position across the video display devices 244-1, 244-2 such that when an event occurs indicating a transition from the first video display device 244-1 to the second video display device 244-2 or visa versa, the execution of the monitor calibration agent 262 will apply a new dynamic mouse ppi setting at the wired or wireless mouse 252-1, 252-2, automatically, that will maintain a cursor speed based on the second video display device ppi density detected at the second video display device 244-2 (e.g., based on the size and resolution of the second video display device 244-2 from which the second video display device ppi density is determined).

During operation, the wireless mouse microcontroller 256 may communicate with a calibration provision service agent 276 executed by a hardware processor 202 of the information handling system 200. Part of the data received from the information handling system 200 via the calibration provision service agent 276 at the wired or wireless mouse 252-1, 252-2 includes data such as the selected mouse ppi of the wired or wireless mouse 252-1, 252-2 (e.g., MS_ppi) by the user on a primary display, the first video display device ppi density associated with the first video display device 244-1 (e.g., Mon1_ppi), the second video display device ppi density associated with the second video display device 244-2 (e.g., Mon2_ppi), as well as the video display device ppi density associated with any additional video display device operatively coupled to the information handling system 200. This data is used by the wireless mouse microcontroller 256 to specifically control and maintain the speed of the cursor as described herein.

Once this data has been received, the wireless mouse microcontroller 256 may derive a dynamic adjusted mouse ppi of the wired or wireless mouse 252-1, 252-2 (e.g., MS_ppi2) that is to be used once it has been detected that the cursor 278 has crossed from the first video display device 244-1 to the second video display device 244-2. This may be done, in an embodiment, by accessing a monitor calibration look-up table 264-2 stored on a wireless mouse memory device 258 to select correct wired or wireless mouse 252-1, 252-2 ppi settings without using an external method of deriving the mouse ppi of the wired or wireless mouse 252-1, 252-2 (e.g., MS_ppi2). In an embodiment, the monitor calibration look-up table 264-2 provides agnostic calibration execution by identifying preferred or optimal input settings to a hardware processor of the information handling system to directly provide those input settings to the wired or wireless mouse 252-1, 252-2 to communicate the ppi values associated with the plurality of video display devices

244-1, 244-2. In an embodiment, the wireless mouse microcontroller 256 may be used to calculate the dynamic mouse ppi of the wired or wireless mouse 252-1, 252-2 (e.g., MS_ppi2). In one embodiment, the wireless mouse microcontroller 256 may divide the set mouse ppi of the wired or wireless mouse 252-1, 252-2 established for the first video display device 244-1 by the first video display device ppi density of the first video display device 244-1 to get a cursor speed ratio. This cursor speed ratio quotient is then multiplied by the second video display device ppi density of the second video display device 244-2 to get the adjusted mouse ppi of the wired or wireless mouse 252-1, 252-2 to be used by the wired or wireless mouse 252-1, 252-2 when the cursor is displayed on the second video display device 244-2 to maintain the same cursor speed ratio on the second video display device 244-2. This cursor speed ratio used across both of the first video display device 244-1 and second video display device 244-2 may be calculated using the following equations:

$$\text{Speed Ratio} = \text{MS\_dpi1}/\text{Mon1\_dpi} = \text{MS\_dpi2}/\text{Mon2\_dpi};$$

$$\text{MS\_dpi2} = \text{Speed Ratio} * \text{Mon2\_dpi2}$$

where MS_dpi1 is the wireless mouse dpi value set by the user and used on the first video display device 244-1, Mon1_dpi is the ppi value density of the first video display device 244-1; Mon2_dpi is the ppi value density of the second video display device 244-2; and MS_dpi2 is the adjusted mouse ppi value used at the second video display device 244-2 to maintain the same cursor speed ratio determined for the first video display device.

This process may be repeated for each additional video display device until the adjusted dynamic mouse ppi of the wired or wireless mouse 252-1, 252-2 describing the cursor speed at each of the video display devices has been derived (e.g., where more than two video display devices 244-1, 244-2 are detected at the information handling system 200).

Having derived or otherwise obtained the dynamic mouse ppi adjustments of the wired or wireless mouse 252-1, 252-2 at each of the video display devices 244-1, 244-2, the wireless mouse microcontroller 256 may concurrently execute a cursor tracking agent 260 to monitor when to trigger the different dynamic mouse ppi settings adjustments under which the wired or wireless mouse 252-1, 252-2 is to operate under across each of the different video display devices 244-1, 244-2. In an embodiment, data for dynamic mouse ppi adjustments may be determined at the information handling system 200 and may be relayed from the information handling system 200 to the wired or wireless mouse 252-1, 252-2. In an embodiment when the wired or wireless mouse 252-1, 252-2 is initialized, a self-homing position algorithm may move the cursor to an edge (e.g., a left edge) of the primary video display device 244-1, for example, to set a known origin of a horizontal position on the video display device 244-1. In an example embodiment, this self-homing position algorithm may move the cursor to a 0 horizontal position and any vertical position so long as the vertical position is relayed to the wired or wireless mouse 252-1, 252-2. As the wired or wireless mouse 252-1, 252-2 is physically moved by a user, the wired or wireless mouse 252-1, 252-2 reports a relative position of "x" horizontal position on any video display device 244-1, 244-2 and a "y" vertical position on any video display device 244-2 to the information handling system 200 and those hardware processors (e.g., 202) that handle the data to be received from the wired or wireless mouse 252-1, 252-2. This relative mouse position data relayed to the information handling system 200 from the wired or wireless mouse 252-1, 252-2 may be in the form of a vector such as Ax+By where "A" is the number of pixels in the horizontal "x" direction and "B" is the number of pixels in the vertical "y" direction.

As a result, the summation of all vectors reflect the current cursor position on any of the plurality of video display devices 244-1, 244-2. During use of the wired or wireless mouse 252-1, 252-2, the cursor tracking agent 260 executed by the wireless mouse microcontroller 256 with the first dynamic mouse ppi value at the set mouse ppi value associated with the operation of the wired or wireless mouse 252-1, 252-2 at the first video display device 244-1 (e.g., MS_ppi1) is applied when the cursor is detected as being present on the first video display device 244-1 among the plurality of video display devices. Similarly, a second dynamic mouse ppi value adjustment is associated with the operation of the wired or wireless mouse 252-1, 252-2 at the second video display device 244-2 (e.g., MS_ppi2) when the cursor is detected as being present on the second video display device 244-2 among the plurality of video display devices 244-1, 244-2. This can also be propagated over any number of video display devices 244-1, 244-2 detected such that an nth dynamic mouse ppi value is associated with the operation of the wired or wireless mouse 252-1, 252-2 at the nth detected video display device (e.g., MS_ppin) when the cursor is detected as being present on the nth video display device among the plurality of video display devices 244-1, 244-2.

As described herein, the physical movement of the wired or wireless mouse 252-1, 252-2 by, for example, an inch, the number of pixels the cursor has moved is calculated for each move. By taking the current mouse ppi associated with the wired or wireless mouse 252-1, 252-2 (e.g., MS_ppi) multiplied by the distance (e.g., inches) the wired or wireless mouse 252-1, 252-2 is detected to move, the number of pixels of movement may be determined. Then, this number of pixels divided by the current monitor's ppi (e.g., Mn_ppi; Mn is the nth monitor) pixel density may be used to determine the location of a cursor on a given (or nth) video display device. This calculation may need to be split across multiple video display device at different video display device ppi densities. In order to maintain the cursor speed across the different video display devices 244-1, 244-2, the cursor speed ratio (e.g., SP) is maintained (SP=MSppi/Mn_ppi) to be within an acceptable range across plural video display devices to prevent the user from detecting a speed difference between the different video display devices 244-1, 244-2 upon detected cursor movement to a next video display device. Again, it is appreciated that the user has set the primary mouse ppi of the wired or wireless mouse 252-1, 252-2 (e.g., MS_ppi) and, therefore, the adjustments to the dynamic, adjusted mouse ppi of the wired or wireless mouse 252-1, 252-2 are based on the individual video display device ppi density values associated with the individual video display devices 244-1, 244-2 that have been received by the wireless mouse microcontroller 256 from the information handling system 200. By continuously tracking the position of the cursor across the plurality of video display devices 244-1, 244-2 similar to the above via execution of the cursor tracking agent 260, a constant cursor speed is maintained when the cursor 278 crosses a border between any of the plurality of video display devices 244-1, 244-2.

It can be appreciated that the systems and methods described herein may include the implementation of a mouse firmware executed on the information handling system 200. This firmware may provide a user with a GUI that allows the user to change the set mouse ppi value associated with the wired or wireless mouse 252-1, 252-2 to match a cursor speed, at least, on a main video display device 244-1 per the user's customizations. In an embodiment, the firmware may allow access to a monitor calibration look-up table 264-2 either maintained on a memory device at the information handling system 200 or over a network and maintained on a network server and accessible via execution of a web human interface device (HID) services such as Dell® SupportAssist®. This allows the user to, at least, select a desired mouse ppi value associated with the wired or wireless mouse 252-1, 252-2 that determines the cursor speed. This mouse ppi value may be changed if the user wants the cursor to be moved slower or faster. In an embodiment, the execution of this mouse firmware executed on the information handling system 200 may also provide a user with suggested cursor speed values based on the detected sizes and resolutions associated with each detected video display device 244-1, 244-2 at the information handling system 200. The user may accept these suggested mouse ppi values to be associated with the wired or wireless mouse 252-1, 252-2 or reject them allowing the user to manually adjust the desired cursor speed value. Nevertheless, the systems and methods described herein, adjusts the dynamic mouse ppi value associated with the wired or wireless mouse 252-1, 252-2 as the movement of the wired or wireless mouse 252-1, 252-2 by the user causes the cursor to remain at a constant speed or speed ratio across the plurality of different video display devices 244-1, 244-2.

In an embodiment, the wireless mouse microcontroller 256 may derive a cursor speed to be used with the wired or wireless mouse 252-1, 252-2 at a second video display device 244-2 based on that cursor speed selected at the first video display device 244-1 via speed ratio being maintained between the first video display device 244-1 and the second video display device 244-2. In an embodiment, the cursor distance travelled over the first video display device 244-1 cursor speed ratio and first video display device ppi density may be used to derive a proportional cursor speed ratio at the second video display device 244-2 having a second video display device ppi density. This proportion speed ratio may be derived by first dividing the mouse ppi value selected by the user for the mouse by the first video display device ppi density value of the first video display device 244-1. In an embodiment, a mouse having a set mouse ppi value of 1600 that moves an inch resulting in a cursor speed of 1600 pixels. Thus, the cursor travel distance is related to the first video display device ppi density value of the first video display device 244-1 with the first video display device ppi density value of the first video display device 244-1 being derived by dividing the resolution of the first video display device 244-1 by the width of the first video display device 244-1. The ppi density of the first video display device 244-1 (e.g., "$P_1$") is derived by dividing the pixel count width resolution value of the first video display device 244-1 by the screen width of the first video display device 244-1 (e.g., $P_1$-pixel_count resolution $(X_1)$/Screen_Width$(W_1)$).

After the user has set the preferred mouse ppi value or speed for primary or first video display device 244-1, a scalar value or cursor speed ration quotient may be derived by the wireless mouse microcontroller 256. The ratio of the wired or wireless mouse 252-1, 252-2 ppi value to the video display device density ppi (e.g., $P_1$) is equal to the user preferred speed scalar "$SC_1$" cursor speed ratio quotient. For the second video display device 244-2 to maintain the same cursor speed ratio for travel of a distance over one unit of time when the wired or wireless mouse 252-1, 252-2 is moving (e.g., 1 inch), the second video display device ppi density value of the second video display device 244-2 (Mppi$_2$) is the monitor density of the second video display device 244-2 ($P_2$). The dynamic, adjusted second mouse ppi is divided by the monitor density of the second video display device 244-2 ($P_2$) to yield the second cursor speed ration (SC). The dynamic adjustment to the mouse ppi setting (mouse ppi for the second video display device) must result in a same or similar cursor speed ratio quotient (e.g., $Sc_1$=mouse ppi for the first video display device divided by $P_2$). Therefore, the second video display device ppi density value of the second video display device 244-2 is equal to the monitor pixel density of the second video display device 244-2 dynamic, adjusted second mouse ppi is equal to the first set mouse ppi divided by the first video display device monitor density (Mon1_ppi) multiplied by the second video display device ppi ($P_2$). The execution of the monitor calibration agent by the wireless mouse microcontroller 256, in an embodiment, will have to set the dynamic mouse ppi value of the wired or wireless mouse 252-1, 252-2 when the cursor is at the second video display device 244-2 dynamically based on the resolution and size of the second video display device 244-2 and the cursor position tracking by the execution of the cursor tracking agent.

Figure 3:
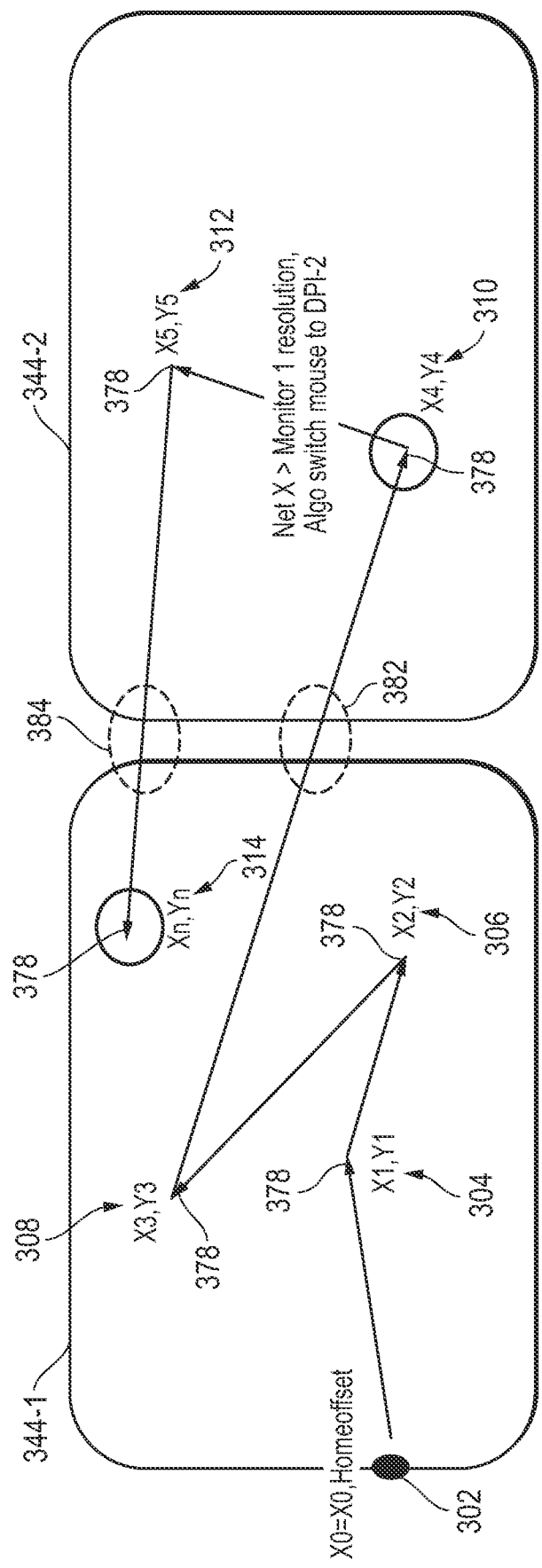
FIG. 3 is a block diagram depicting two video display devices and movement of a cursor across the video display devices according to an embodiment of the present disclosure.

FIG. 3 is a block diagram depicting two video display devices 344-1, 344-2 and movement of a cursor 378 across the video display devices 344-1, 344-2 according to an embodiment of the present disclosure. A first video display device 344-1 and a second video display device 344-2 is shown with, in an embodiment, the first video display device 344-1 acting or categorized as a main video display device. Again, this is merely an example orientation of the first video display device 344-1 relative to the second video display device 344-2 and the present specification contemplates a different orientation as well as the inclusion of additional video display devices in addition to the first video display device 344-1 and second video display device 344-2 shown.

During operation of the wireless mouse described herein, the information handling system and wireless mouse may be operatively coupled to each other via, for example, a wireless BT® connection. Once initialized, the wireless mouse may execute a self-homing algorithm that sets the initial location of the cursor 378 at a home position 302 shown in FIG. 3 as x=0, Homeoffset with a 0 horizontal position and a predetermined vertical position. This predetermined vertical position may be relayed to the information handling system so that each of the information handling system and wireless mouse agree on the initial location home position 302 of the cursor 378 on the first video display device 344-1.

During operation, the wireless mouse may be moved a certain distance which, according to the set mouse ppi value associated with the wireless mouse causes the cursor 378 to move a distance across the first video display device 344-1 or the second video display device 344-2. For example, a first movement of the wireless mouse is detected and the cursor 378 is moved to a first location 304 x1,y1 on the first video display device 344-1. A second movement of the wireless mouse may be detected and the cursor 378 is moved to a second location 306 x2,y2. A third movement of the wireless mouse may be detected and the cursor 378 is moved to a third location 308 x3,y3. It is noted that each of the first location 302, second location 304, and third location 306 from movement of the wireless mouse all lead the cursor 378 to be located within the boundaries of the first video display device 344-1. These three moves of the wireless mouse may indicate that the user is interfacing with a GUI presented to the user on the first video display device 344-1.

However, a fourth movement of the wireless mouse may be detected and the cursor 378 is moved across the boundary between the first video display device 344-1 and second video display device 344-2 at a first boundary location 382 with the cursor 378 ending at a fourth location 310 x4,y4 on the second video display device 344-2. As described herein, however, the dynamic mouse ppi value of the wireless mouse may be dynamically changed as the cursor 378 transitions from the first video display device 344-1 to the second video display device 344-2 at this first boundary location 382. As described herein, the monitor calibration agent may be executed by the wireless mouse microcontroller to calculate a different dynamic mouse ppi value adjustment to be associated with the wireless mouse when the cursor 378 is present on the second video display device 344-2. Thus, where the cursor tracking agent has detected that the cursor 378 has crossed this boundary at the first boundary location 382, the wireless mouse microcontroller may dynamically switch between the first set mouse ppi value of the wireless mouse being used at the first video display device 344-1 to a second dynamic adjusted mouse ppi value of the wireless mouse when the cursor tracking agent has detected that the cursor has crossed the boundary from the first video display device 344-1 to the second video display device 344-2 among the plurality of video display devices 344-1, 344-2.

The movement of the wireless mouse may continue with it being moved a fifth time which is detected with the cursor 378 being moved to a fifth location 312 x5,y5. Again, this movement of the wireless mouse may indicate that the user is interfacing with a GUI presented to the user on the second video display device 344-2.

FIG. 3 further shows the movement of the wireless mouse causes the cursor 378 to move to yet another sixth location 314 Xn,Yn back to the first video display device 344-1 again crossing a boundary between the second video display device 344-2 and first video display device 344-1 at a second boundary location 384. As described herein, the second boundary location 384 is the point where a dynamic, adjusted mouse ppi value associated with the operation of the wireless mouse at the second video display device 344-2 is switched backed to the first dynamic adjusted ppi value that was the set mouse ppi value associated with the operation of the wireless mouse at the first video display device 344-1. This swapping from the first mouse ppi value to the second mouse ppi value and back again show the dynamic, adjustable values of the mouse ppi value of the wireless mouse in an embodiment. This switch of dynamic mouse ppi value may be repeated any number of times as the user moves the cursor 378 from the first video display device 344-1 to the second video display device 344-2 and back again in order to maintain the cursor speed and consistent cursor speed ratio as described herein.

Figure 4:
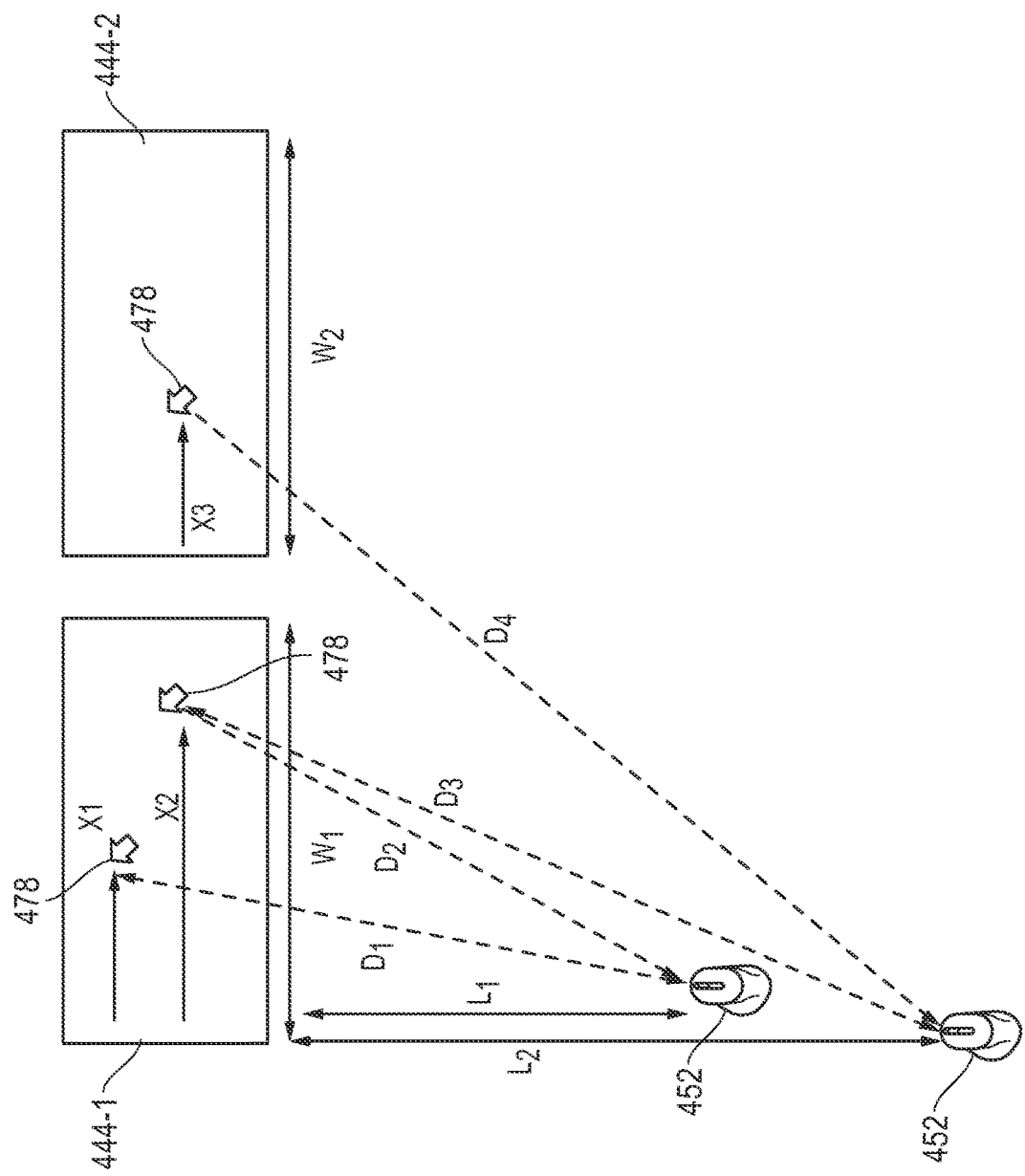
FIG. 4 is a block diagram depicting two video display devices and movement of a cursor across the video display devices with the mouse at a distance from the video display devices according to another embodiment of the present disclosure.

FIG. 4 is a block diagram depicting two video display devices 444-1, 444-2 and movement of a cursor 478 across the video display devices 444-1, 444-2 with the wired or wireless mouse 452-1, 452-2 further adjusted for detected distance D of the wired or wireless mouse 452-1, 452-2 and, thus a user, from cursor location the video display devices 444-1, 444-2 according to another embodiment of the present disclosure. It is appreciated that the mouse 452 may be a wired or wireless mouse 452-1, 452-2 as described may be a wired mouse operatively coupled to the information handling system via a cable coupled to, for example, a universal serial bus (USB) port.

As described herein, the wired or wireless mouse 452-1, 452-2 may execute a wireless mouse distance calibration agent with the wireless mouse microcontroller in order to maintain control of the cursor 478 across the video display devices 444-1, 444-2 for cursor speed control depending on perception of a user at different distances from the video display devices 444-1, 444-2 and cursor location. The execution of the wireless mouse distance calibration agent by the wireless mouse microcontroller allows the wireless mouse microcontroller to detect a distance D between the wireless mouse and the cursor on each of the video display devices 444-1, 444-2 in order to maintain a ratio of cursor speed across the plurality of video display devices relative to the distance of the wireless mouse from the cursor location on each display device 444-1, 444-2. In the example embodiment where the mouse 452 is a wired or wireless mouse 452-1, 452-2, a distance sensor such as a camera, an electronic distance meter, an ultrasonic ranging module, a radar, and a laser range finder. In the example embodiment where the mouse 452 is a wired mouse 452 the length of the cable may be used as a maximum distance that the wired mouse 452 may be away from, at least, one video display device 444-1, 444-2 with other sensors described herein being used to indicate the distance of the wired mouse 452 from the video display devices 444-1, 444-2.

The adjustments made to cursor speed by the wireless mouse distance calibration agent are done to maintain a sensation of the cursor maintaining its size and cursor speed to a user/viewer at different distances from each of the first video display device 444-1 and second video display device 444-2 in an embodiment. In an embodiment, the wireless mouse microcontroller executed code instructions of the wireless mouse distance calibration agent detects a first distance $D_3$ between the wired or wireless mouse 452-1, 452-2 and the cursor at a first location on the first video display device 444-1 and a second distance $D_4$ to a cursor at a second location between the wired or wireless mouse 452-1, 452-2 and the second video display device 444-2 to determine a ratio of cursor distance $D_3$ and $D_4$ to adjust cursor speed via a distance adjustment to the mouse ppi value to maintain a sensation of the cursor 478 maintaining its size and cursor speed upon transition from the first video display device 444-1 to the second video display device 444-2 when the first distance $D_3$ and the second distance $D_4$ are not equal. Similarly, the wireless mouse distance calibration agent may detect a first distance $D_1$ between the wired or wireless mouse 452-1, 452-2 and the cursor at a first location on the first video display device 444-1 and a second distance $D_2$ to a cursor at a second location between the wired or wireless mouse 452-1, 452-2 and the first video display device 444-1 to determine a ratio of cursor distance $D_1$ and $D_2$ to adjust cursor speed via a distance adjustment to the mouse ppi value. This may be applied to the cursor on the same video display device when a user is at a distance as well in some embodiments to also maintain a sensation of the cursor 478 maintaining its size and cursor speed across the same (as shown, first) video display device 444-1 when the first distance $D_1$ and the second distance $D_2$ are not equal.

During operation and to maintain a sensation by the user of the wired or wireless mouse 452-1, 452-2 that the cursor 478 is not getting smaller or slower at a further-away video display device 444-2 in one example, the execution of the wireless mouse distance calibration agent maintains an eyeball scanning angle as the distance between the wired or wireless mouse 452-1, 452-2 and each of the video display devices 444-1, 444-2 changes with movement of the cursor 478 relative to location of the wireless mouse. As such, the execution of the wireless mouse distance calibration agent controls the ratio of the movement of the cursor speed (e.g., "X"=mouse ppi/density of video display device) within or across each of the video display devices 444-1, 444-2 based on the distance of the wired or wireless mouse 452-1, 452-2 from the video display devices 444-1, 444-2 (e.g., "L" or "D" derived from distance L and a cursor location). Thus, the user viewing distance D and angle of the cursor 478 on each of the first video display device 444-1 and second video display device 444-2 is determined. When "D" is increased, cursor speed "X" is to be increased proportionally so that the perceived cursor movement across a scanning angle is the same across the same or each of the different video display devices 444-1, 444-2. Maintaining the ratio of $X_2/D_3$, cursor travel across the first video display device 444-1 to a same ratio of $X_3/D_4$ can maintain a similar cursor speed appearance between the first video display device 444-1 and the second video display device 444-2 for movement of cursor 478 in an embodiment. Similarly, maintaining the ratio of $X_1/D_1$, cursor travel across the first video display device 444-1 to a same ratio of $X_2/D_2$ can maintain a similar cursor speed appearance across two cursor locations on the same first video display device 444-1 for movement of cursor 478 in another embodiment.

"$X_2$" is determined by dividing the mouse ppi value for cursor speed as adjusted for the first video display device 444-1 by the pixel count resolution of the first video display device 444-1 (e.g., $X_2=Mppi_1/P_1$). To maintain appearance of cursor speed across the two video display devices 444-1, 444-2, $X_2/D_3=X_3/D_4$ with $D_4/D_3*Mppi_1/P_1=X_3$ where $X_3=Mppi_2/P_2$ to enable a determination of mouse ppi value ($Mppi_2$). Here, the lateral movement of the cursor across the first video display device (e.g., "$X_2$") is determined by dividing the set mouse ppi (e.g., "$Mppi_1$") by the pixel density (e.g., "$P_1$") of the first video display device 444-1. Similarly, the lateral movement of the cursor across the second video display device (e.g., "$X_3$") is determined to relate to a second mouse ppi (e.g., "$Mppi_2$") to the pixel density (e.g., "$P_2$") of the second video display device 444-2 as modified by the distance ratio of the mouse from the second video display device The pixel density is equal to the pixel count resolution divided by the width of the screen of the given video display device (e.g., either of the first video display device 444-1 or second video display device 444-2). In order to maintain the ratio of the ratio of the movement of the cursor speed across each of the video display devices 444-1, 444-2 (e.g., "X") based on the distance of the wired or wireless mouse 452-1, 452-2 from the cursor video display devices 444-1, 444-2 (e.g., "D"), the microcontroller of the wired or wireless mouse 452-1, 452-2 may calculate the dynamic ppi value of the wired or wireless mouse 452-1, 452-2 at a second distance by dividing the ratio of the second distance of the wired or wireless mouse 452-1, 452-2 relative to the second video display device 444-2 to a first distance of the wired or wireless mouse 452-1, 452-2 to the first video display device 444-1 and multiplying this ratio by the dynamic ppi value of the wired or wireless mouse 452-1, 452-2 as adjusted for the second video display device 444-2 pixel density. This results in the dynamic mouse ppi of the wired or wireless mouse 452-1, 452-2 over the plural video display devices 444-1 and 444-2 located at different distances from the wired or wireless mouse 452-1, 452-2, or as described, such adjustment may also be applied to across the same video display device in some embodiments.

Figure 5:
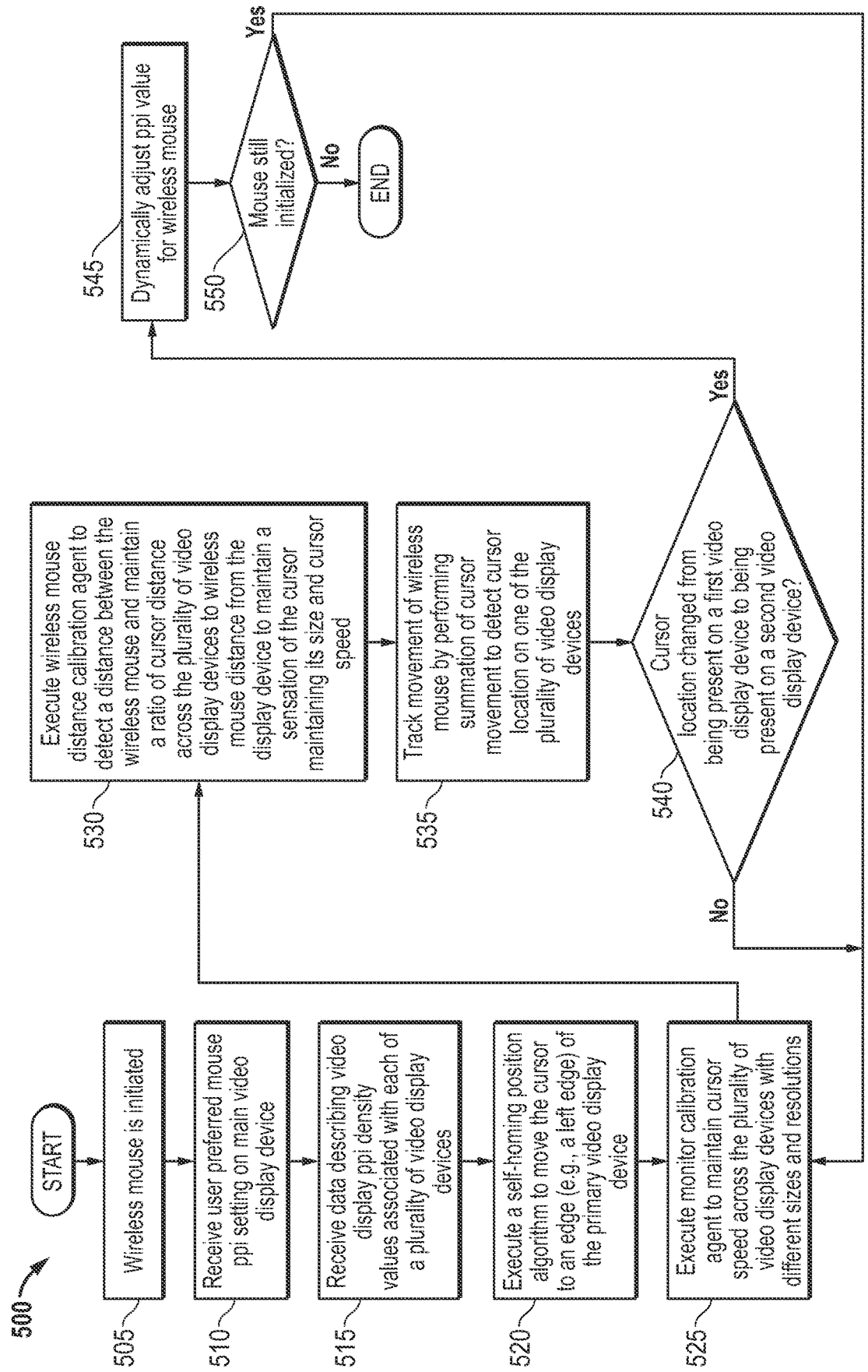
FIG. 5 is a flow diagram illustrating a method of maintaining a cursor speed across a plurality of video display devices according to an embodiment of the present disclosure.

FIG. 5 is a flow diagram illustrating a method 500 of maintaining a cursor speed across a plurality of video display devices according to an embodiment of the present disclosure. The method 500 may include the initialization of the wireless mouse at block 505 in an example embodiment. It is appreciated, however, that the method described in FIG. 5 equally applies to a user using a wired mouse that this operatively coupled to an information handling system at a USB port for example. Therefore, the present specification contemplates that the systems and methods described in connection with FIG. 5 as well as those systems and methods described in the present specification applies to both wired and wireless mice.

Initialization of the wireless mouse may be accomplished by the user activating a switch or button on the wireless mouse. This causes the wireless mouse microcontroller to be initialized and operate, for example, a wireless mouse radio and associated wireless mouse antenna to initiate a wireless connection with a radio at the information handling system in order to allow the wireless mouse to communicate with the information handling system.

At block 510, the method 500 includes receiving a user-preferred mouse ppi setting to be used on the main display device. In an embodiment, the main display device may be a first video display device that is operatively coupled to a laptop-type information handling system as described herein. As described herein, the systems and methods described herein may include the implementation of a wireless mouse adjustment software executed on the information handling system that facilitates the user selecting this user-preferred ppi value via the operating system (OS) on the information handling system. This software may provide a user with a GUI that allows the user to change the mouse ppi value associated with the wireless mouse to match a cursor speed, at least, on a main video display device per the user's customizations. This allows the user to, at least, select a desired mouse ppi value associated with the wireless mouse that determines the cursor speed. This mouse ppi value may be changed if the user wants the cursor to be moved slower or faster. In an embodiment, the execution of this wireless mouse software executed on the information handling system may also provide a user with suggested cursor speed values based on the detected sizes and resolutions associated with each detected video display device at the information handling system. Such data may be accessible via execution of a web human interface device (HID) services such as Dell® SupportAssist®. The user may accept these suggested mouse ppi values to be associated with the wireless mouse or reject them allowing the user to manually adjust the desired cursor speed value. Mouse firmware may be executed on the wireless mouse microcontroller to adjust cursor speed such as among varying video display devices automatically according to embodiments herein.

At block 515, the method 500 includes the wireless mouse receiving data describing video display device ppi density values associated with each of the plurality of video display devices including that of the main video display device and any external video display devices operatively coupled to the information handling system. In an embodiment, the firmware executing on the wireless mouse microcontroller as described herein may access a monitor calibration look-up table either maintained on a memory device at the information handling system or over a network and maintained on a network server. For one or more coupled video display devices, the systems and methods described herein execute firmware on a mouse microcontroller to adjust the dynamic mouse ppi value associated with the wireless mouse as the movement of the wireless mouse by the user causes the cursor to cross between operatively coupled video display devices and keep cursor speed constant across the plurality of different video display devices.

At block 520, the method 500 may include the execution of a self-homing position algorithm code instructions on a microcontroller of the mouse and via the display driver software on the OS of the information handling system to move the cursor to an edge (e.g., a left edge) of the primary or main video display device such as the first video display device described herein. In an example embodiment, this self-homing position algorithm may move the cursor to a 0 horizontal position and any vertical position so long as the vertical position is relayed to the microcontroller of the wireless mouse. As the wireless mouse is physically moved by a user, the wireless mouse reports a relative position of "x" horizontal position on any video display device and a "y" vertical position on any video display device to the information handling system and any other hardware processors that handle the position data to be received at the information handling system from the wireless mouse. This relative mouse position data relayed to the information handling system from the wireless mouse may be in the form of a vector such as Ax+By where "A" is the number of pixels in the horizontal "x" direction and "B" is the number of pixels in the vertical "y" direction. Again, it is appreciated that the values of both "A" and "B" can be positive or negative numbers such that a negative value of "A" is indicative of the cursor moving to the left, a positive value of "A" is indicative of the cursor moving to the right, a negative value of "B" is indicative of the cursor moving upward, and a positive value of B is indicative of the cursor moving downward.

As a result, during operation of the wireless mouse, the summation of all vectors reflect the current cursor position on any of the plurality of video display devices. During use of the wireless mouse, the cursor tracking agent executed by the wireless mouse microcontroller with the first set mouse ppi value (e.g., MS_ppi1) to be associated with the operation of the wireless mouse at the first video display device is applied when the wireless mouse is moved and the cursor is detected as being present on the first video display device among the plurality of video display devices. Similarly, a second dynamic mouse ppi value (e.g., MS_ppi2) is associated with the operation of the wireless mouse when the wireless mouse is moved and the cursor is detected at the second video display device among the plurality of video display devices. This can also be propagated over any number of video display devices detected such that an nth dynamic mouse ppi value (e.g., MS_ppin) is associated with the operation of the wireless mouse during wireless mouse movement when the cursor is detected as being present on the nth video display device among the plurality of video display devices.

The method 500 further includes, at block 525, executing a monitor calibration agent to maintain cursor speed across the plurality of vide display devices with different sizes and resolutions according to embodiments herein. As described herein, the monitor calibration agent may be executed by the wireless mouse microcontroller to calculate a different dynamic mouse ppi value to be associated with the wireless mouse when the cursor is present on the second video display device. Thus, where a cursor tracking agent described herein has detected that the cursor has crossed a display device boundary between a first video display device and a second video display device, the wireless mouse microcontroller may dynamically switch between the first mouse ppi value of the wireless mouse being used at the first video display device to a second adjusted mouse ppi value of the wireless mouse when the cursor tracking agent has detected that the cursor has crossed the boundary from the first video display device to the second video display device among the plurality of video display device with a lookup table determined accord to embodiments herein. The cursor speed ratio is maintained the changed pixel density of the second video display device with the new, adjusted dynamic mouse ppi value.

At block 530, the method 500 includes executing the wireless mouse distance calibration agent to detect a distance between the wireless mouse and either the first video display device or a second video display device and the viewing angle to each of the first video display device and second video display device according to one example embodiment. The cursor speed is adjusted based on distances from the wireless mouse to cursor location on the first video display device or a cursor location on the second video display device by a ratio of cursor distance with respect to the cursor location on either of the plurality of video display devices to maintain adjustments to cursor speed for a sensation of the cursor maintaining its size and cursor speed even at varying mouse distances away from the first video display device or the second video display device. During operation and to maintain a sensation by the user of the wireless mouse that the cursor is not getting slower, the execution of the wireless mouse distance calibration agent maintains an eyeball scanning angle for the distance between the wireless mouse and any of the video display devices and cursor movement changes. As such, the execution of the wireless mouse distance calibration agent controls the ratio of the movement of the cursor speed (e.g., "X") across the video display devices based on distance of the wireless mouse from the video display devices (e.g., "D"). To maintain a sensation by the user of the wireless mouse that the cursor is not getting smaller at a further-away video display device in one example, the execution of the wireless mouse distance calibration agent maintains an eyeball scanning angle as the distance between the wireless mouse and each of the video display devices changes with movement of the cursor. When "D" is increased, "X" is to be increased proportionally so that the perceived cursor movement across a scanning angle is the same across each of the different video display devices at differing distances of cursor location from the wireless mouse and, thus, the user. Maintaining the ratio of X/D, cursor travel across the first video display device to a same ratio at the second video display device can maintain a similar cursor speed appearance between the first video display device and the second video display device.

At block 535, movement of the wireless mouse is tracked and applied to cursor movement by performing summation of cursor movement to correspond to the wireless mouse movement distance and current dynamic mouse ppi value to detect cursor location by movement a number of pixels at the pixel densities on one or more of the plurality of video display devices. As described herein, the execution of the cursor tracking agent allows the wireless mouse to actively track a current cursor position across the video display devices form wireless mouse movement such that when an event occurs indicating a transition from the first video display device to the second video display device, such as reaching the end of the horizontal width of the first video display device by the cursor, the execution of the monitor calibration agent will apply a new dynamic mouse ppi setting adjustment at the wireless mouse, automatically. In this way the method will maintain a cursor speed based on the second video display device ppi density detected at the second video display device (e.g., based on the size and resolution of the second video display device from which the second video display device ppi density is determined).

As described herein, the method 500 includes determining if the cursor location changed from being present on a first video display device to being present on a second video display device at block 540. Where the location of the cursor has not changed from a first to a second video display device, the method 500 continues to block 525 with the execution of the monitor calibration agent maintain cursor speed at the first video display device. Where, at block 540, where it is determined that the location of the cursor has changed from a first to a second video display device, the method 500 continues to block 545 with the monitor calibration agent dynamically adjusting the dynamic mouse ppi value associated with the wireless mouse based on the second video display device ppi density value associated with the second video display device. Thus, where the cursor tracking agent has detected that the cursor has crossed this video display device boundary between the first video display device and the second video display device, the wireless mouse microcontroller may dynamically switch between the first mouse ppi value of the wireless mouse being used at the first video display device to a second mouse ppi value of the wireless mouse. Again, the second video display device ppi density value associated with the second video display device is obtained by the wireless mouse microcontroller communicating with a calibration provision service agent executed by a hardware processor of the information handling system. Part of the data received from the information handling system via the calibration provision service agent at the wireless mouse includes the selected mouse ppi of the wireless mouse (e.g., MS_ppi) for cursor speed on a primary video display device, the first video display device ppi density associated with the first video display device (e.g., Mon1_ppi), the second video display device ppi density associated with the second video display device (e.g., Mon2_ppi), as well as the video display device ppi density associated with any additional video display device operatively coupled to the information handling system. This data is used by the wireless mouse microcontroller to specifically control and maintain the speed of the cursor via a cursor speed ratio to adjust the dynamic mouse ppi value for mouse movement as described herein.

Once this data has been received, the wireless mouse microcontroller may derive a dynamic mouse ppi value of the wireless mouse (e.g., MS_ppi2) that is to be used once it has been detected that the cursor has crossed from the first video display device to the second video display device. This may be done, in an embodiment, by accessing a monitor calibration look-up table stored on a wireless mouse memory device to select correct mouse ppi values settings without using an external method of deriving the mouse ppi of the wireless mouse (e.g., MS_ppi2) in some embodiments. In some embodiments, the wireless mouse microcontroller may be used to calculate the dynamic mouse ppi of the wireless mouse (e.g., MS_ppi2) or the information handling system may be used to calculate these values on the fly or they may be stored in the monitor calibration lookup table stored on the wireless mouse in various embodiments. In such embodiments, the wireless mouse microcontroller or information handling system hardware processor may divide the set mouse ppi value of the wireless mouse at the first video display device by the first video display device ppi density of the first video display device to obtain a cursor speed ratio. This cursor speed ratio quotient is then multiplied by the second video display device ppi density of the second video display device to get the dynamic adjusted mouse ppi value for the wireless mouse to be used when the cursor is at the second video display device. This process may be repeated for each additional video display device until the dynamic adjustments to the mouse ppi values of the wireless mouse describing the cursor speed at each of the video display devices has been derived (e.g., where more than two video display devices are detected at the information handling system).

At block 550, the method 500 includes a determination whether the wireless mouse is still initialized. Where the wireless mouse is still initialized, the method may continue to block 525 with the execution of the monitor calibration agent as described herein. Where the wireless mouse is no longer initialized, the method 500 may end.

The blocks of the flow diagrams of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A mouse operatively coupled to an information handling system, comprising:
a mouse microcontroller;
a mouse memory device;
a mouse power management unit (PMU) to provide power to the mouse microcontroller and mouse memory device;
the mouse microcontroller to receive data describing display device pixel per inch (ppi) density values associated with each of a first video display device and a second video display device operatively coupled to the information handling system;

the mouse microcontroller executing code instructions of a cursor tracking agent to track a location of a cursor, controlled by a movement of the mouse, across the first video display device and second video display device; and the mouse microcontroller executing code instructions of a monitor calibration agent to maintain a cursor speed across the first video display device and the second video display device by:

determining plural adjusting mouse pixel per inch (ppi) values for the movement of the mouse based on a first display device ppi density value for the first video display device and a second display device ppi density value for the second video display device; and switching between a first mouse ppi value to a second mouse ppi value at the mouse when the cursor tracking agent has detected that the cursor has crossed a display device boundary from the first video display device to the second video display device.

2. The information handling system of claim 1 further comprising:

the mouse microcontroller to execute code instructions of a mouse distance calibration agent to detect a first distance between the mouse and the first video display device and a second distance between the mouse and the second video display device to determine a ratio of cursor distance to adjust cursor speed via a distance adjustment to the plural adjusting mouse ppi values to maintain a sensation of the cursor maintaining its size and cursor speed upon transition from the first video display device to the second video display device when the first distance and the second distance are not equal.

3. The information handling system of claim 1 further comprising:

the cursor tracking agent tracks the location of the cursor by determining cursor location data from detected movement distance of the mouse, the adjusting mouse ppi values, and the width and pixel density of the first video display device and the second video display device.

4. The information handling system of claim 1 further comprising:

the mouse microcontroller accesses a monitor calibration look-up table to provide data for adjusting the cursor speed of the mouse across the first video display device and the second video display device for the adjusting mouse ppi values based on the detected different first video display device ppi density values and the second video display device ppi density value.

5. The information handling system of claim 1 further comprising:

the monitor calibration agent maintains the cursor speed across the first video display device and second video display device by establishing a cursor speed ratio quotient of the mouse ppi value for a cursor speed at the first video display device and adjusting the mouse ppi value for the cursor speed ratio for the cursor on the second video display device by multiplying the cursor speed ratio quotient by the second video display device ppi density value.

6. The information handling system of claim 1 further comprising:

the mouse microcontroller executing the cursor tracking agent to detect the location of the cursor and a transition across the video display device boundary by the cursor from the first video display device to the second of video display device by executing a self-homing position algorithm to place the cursor at an edge on the first video display device, loading a mouse ppi value for the mouse based on a selected cursor speed value selected by a user on a graphical user interface (GUI) of the operatively coupled information handling system, and detecting movement of the mouse to determine when the cursor has crossed the width of the first video display device to transition to the second video display device.

7. The information handling system of claim 1, wherein the mouse is a wireless mouse and the monitor calibration agent receives data wirelessly from the information handling system describing a home position calibration at a left edge of the first video display device from a hardware processor on the operatively coupled information handling system, the home position calibration indicating a horizontal and vertical start location of the cursor such that the cursor tracking agent can track a real-time location of the cursor on the first video display device or the second video display device.

8. A method of maintaining a cursor speed with movement of a mouse across a plurality of video display devices, comprising:

with a mouse microcontroller, receiving data describing video display device pixel per inch (ppi) density values associated with each of the plurality of video display devices operatively coupled to an information handling system;

with the mouse microcontroller, executing a cursor tracking agent to track a location of a cursor, controlled by a movement of the mouse by a user, across the plurality of video display devices; and with the mouse microcontroller, executing a monitor calibration agent to maintain cursor speed across a display device boundary between at least two video display devices by automatically adjusting mouse pixel per inch (ppi) values for cursor speed from the movement of the mouse based on the differences in the video display device ppi density values of the at least two video display devices; and switching between a first mouse ppi value to a second mouse ppi value for the mouse when the cursor tracking agent has detected that the cursor has crossed the display device boundary.

9. The method of claim 8 further comprising:

with the mouse microcontroller, executing a mouse distance calibration agent to detect a first distance between the mouse and a first video display device and a second distance between the mouse and a second video display device to determine a ratio of cursor distance to adjust cursor speed via a distance adjustment to the mouse ppi value to maintain a sensation of the cursor maintaining its size and cursor speed upon transition from the first video display device to the second video display device across the video display boundary when the first distance and the second distance are not equal.

10. The method of claim 8 further comprising:

executing the cursor tracking agent with the mouse microcontroller to track the location of a cursor by receiving cursor location data on the at least two video display devices from the information handling system.

11. The method of claim 8 further comprising:

accessing a monitor calibration look-up table by the mouse microcontroller to determine adjustment to the mouse ppi value to maintain the cursor speed from the movement of the mouse across the plurality of video display devices having different video display device ppi density values.

12. The method of claim 8 further comprising:
executing code instructions of the monitor calibration agent via the mouse microcontroller to maintain cursor speed across a first video display device and a second video display device of the at least two video display devices by establishing a cursor speed ratio quotient of the mouse ppi value for a cursor speed across the first video display device and adjusting the mouse ppi value for the cursor on the second video display device by multiplying the cursor speed ratio quotient by the second video display device ppi density value.

13. The method of claim 8, further comprising:
the mouse microcontroller executing the cursor tracking agent to detect the location of the cursor and a transition across a second video display device boundary by the cursor from a second video display device to a third of video display device of the plurality of video display devices and adjusting the mouse ppi value for the mouse to maintain the cursor speed based on a third video display device ppi density value.

14. The method of claim 8 further comprising:
receiving data describing a home position calibration at the monitor calibration agent from a hardware processor on the operatively coupled information handling system, the home position calibration indicating a horizontal and vertical start location of the cursor such that the cursor tracking agent can track a real-time location of the cursor on the at least two video display devices.

15. A mouse operatively coupled to an information handling system, comprising:
a mouse microcontroller;
a mouse memory device;
a mouse power management unit (PMU) to provide power to the mouse microcontroller and mouse memory device;
the mouse microcontroller to receive data describing display device pixel per inch (ppi) density values associated with each of a first video display device and a second video display device operatively coupled to the information handling system;
the mouse microcontroller executing code instructions of a cursor tracking agent to track a location of a cursor, controlled by a movement of the mouse by a user, across the first video display device and second video display device; and
the mouse microcontroller executing code instructions of a monitor calibration agent to maintain cursor speed across the plurality of video display devices by dynamically adjusting a mouse ppi value to control cursor speed with the movement of the mouse based on a first video display device ppi density value of the first video display device and a second video display device ppi density value of the second video display device; and
the mouse microcontroller switching between a first mouse ppi value to a second mouse ppi value for the mouse when the cursor tracking agent has detected that the cursor has crossed a display device boundary from the first video display device to the second video display device to maintain a cursor speed ratio over both the first video display device and the second video display device.

16. The information handling system of claim 15 further comprising:
the mouse microcontroller executing code instructions of the cursor tracking agent to track the location of a cursor on the first video display device and second video display device by determining cursor location data from detected movement distance of the mouse, the dynamic adjustments to the mouse ppi value, and the width and pixel density of the first video display device and the second video display device.

17. The information handling system of claim 15, wherein the mouse is a wired mouse operatively coupled to the information handling system via a universal serial bus (USB) port on the information handling system and wherein the mouse microcontroller accesses a monitor calibration look-up table stored on a storage device on the information handling system to adjust the mouse ppi value to maintain the cursor speed from the movement of the mouse across the first video display device to the second video display device where the mouse PPI value is adjusted for the different display device ppi density values of the first video display device and the second video display device.

18. The information handling system of claim 15 further comprising:
the monitor calibration agent maintains a cursor speed across the first video display device and second video display device by establishing a cursor speed ratio quotient of the mouse ppi value for a cursor speed across the first video display device and adjusting the mouse ppi value to maintain cursor speed on the second video display device by multiplying the cursor speed ratio quotient by the second video display device ppi density value.

19. The information handling system of claim 15 further comprising:
the mouse microcontroller executing the cursor tracking agent to detect the location of the cursor and detect a transition across the video display device boundary by the cursor from the second video display device to the video display device and adjusting the mouse ppi value for the mouse to maintain cursor speed value back for the video display device ppi density value of the first video display device.

20. The information handling system of claim 15 further comprising:
the monitor calibration agent receiving data describing a home position calibration for the cursor from a hardware processor on the operatively coupled information handling system, where the home position calibration for the cursor indicating a horizontal and vertical start location of the cursor such that the cursor tracking agent can track a real-time location of the cursor across the first video display device or the second video display device based on the movement of the mouse.

* * * * *